June 23, 1942.  C. C. BENNETT  2,287,084
APPARATUS FOR TESTING MOTORCYCLES
Filed Nov. 3, 1939  4 Sheets-Sheet 1

INVENTOR.
CLAUDE C. BENNETT
BY
ATTORNEY.

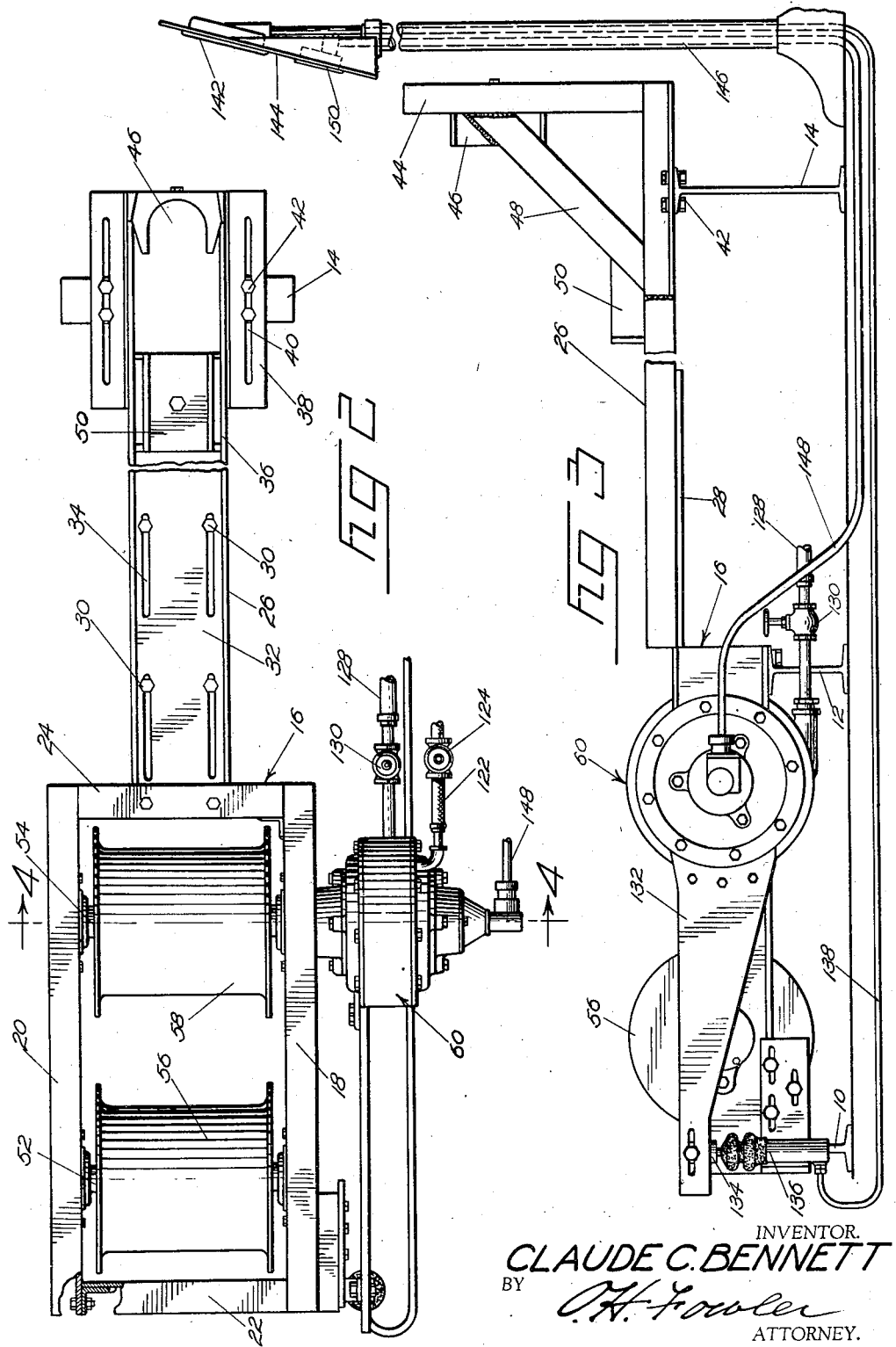

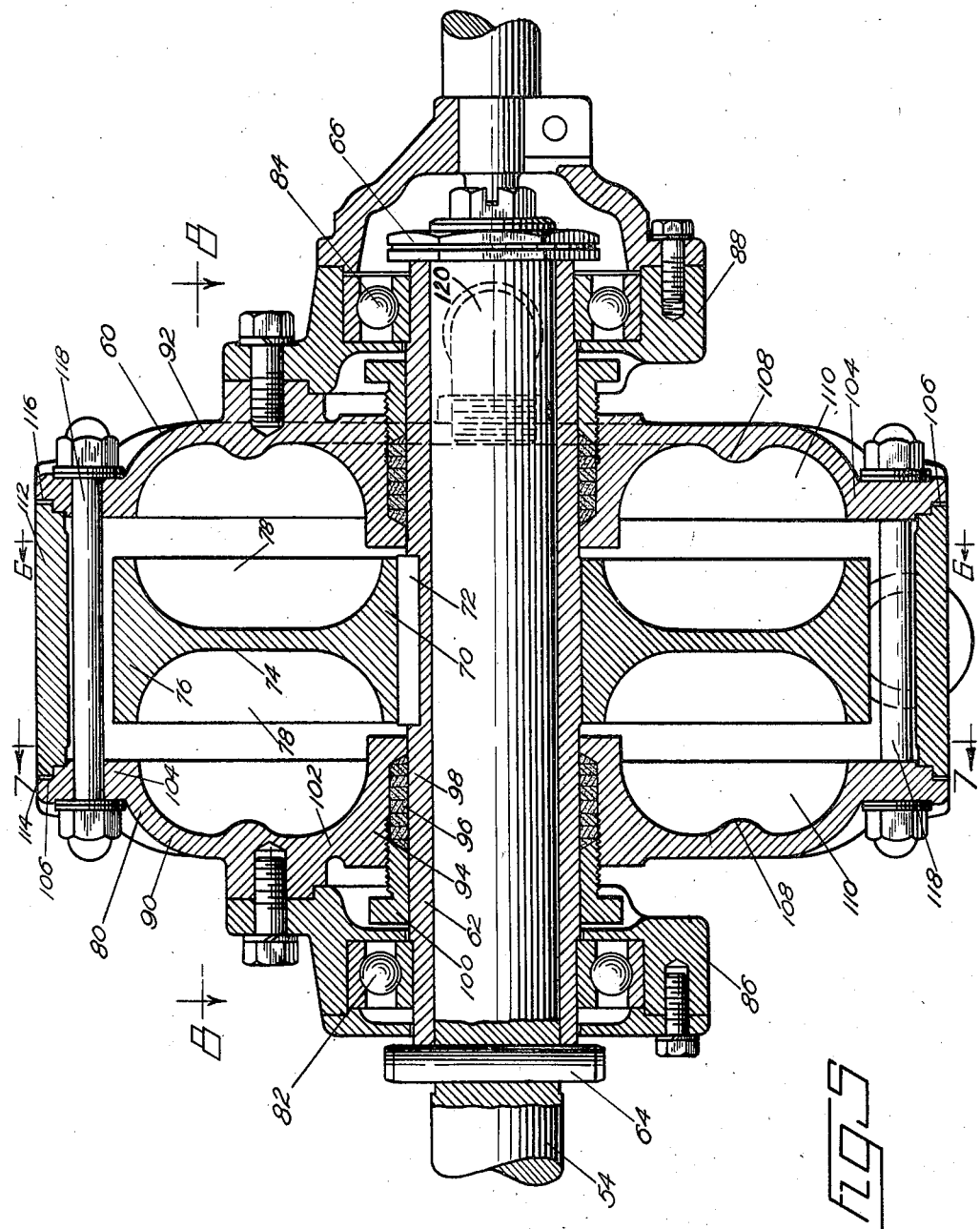

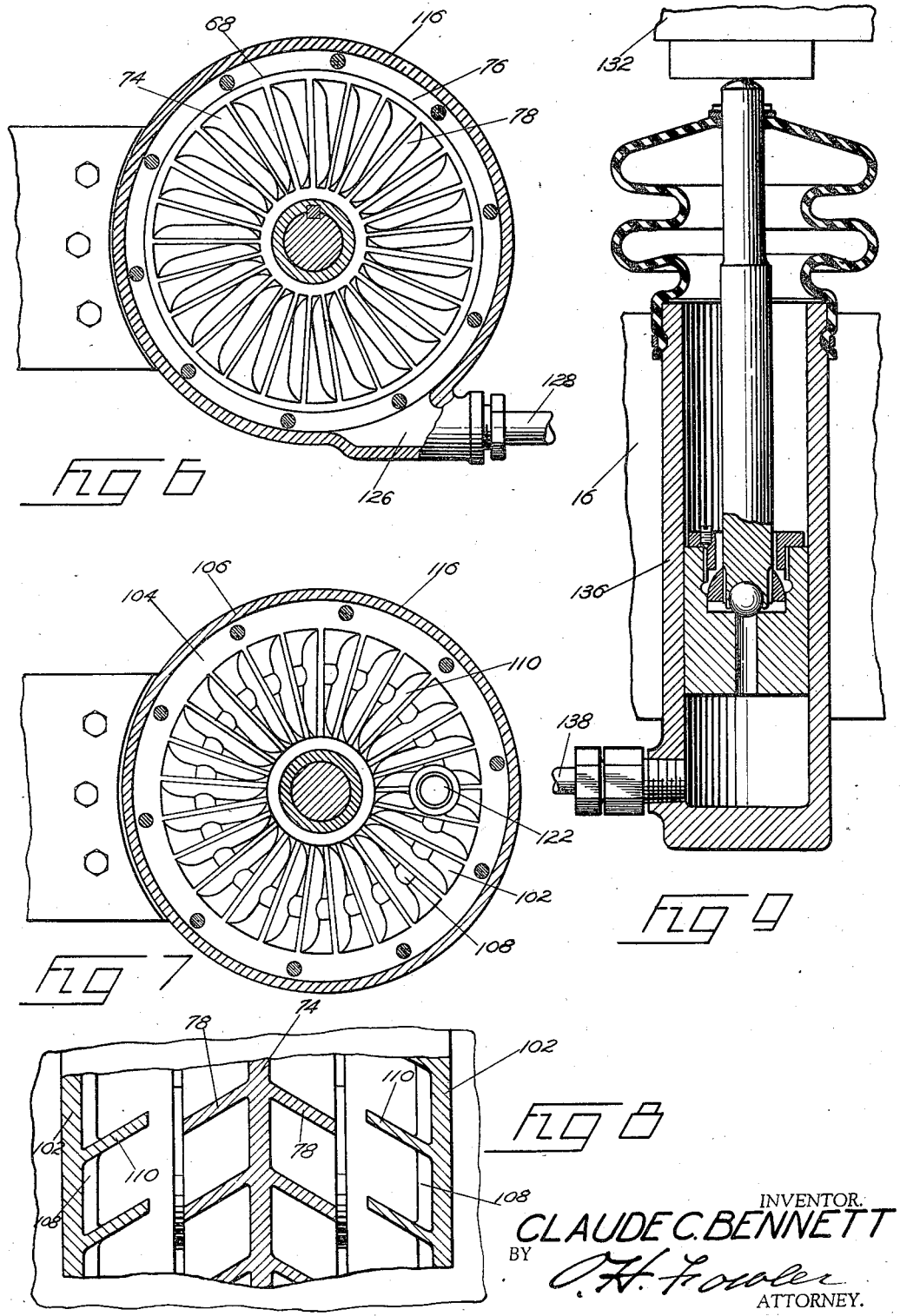

Patented June 23, 1942

2,287,084

UNITED STATES PATENT OFFICE 2,287,084

APPARATUS FOR TESTING MOTORCYCLES

Claude C. Bennett, South Bend, Ind., assignor to A. E. Feragen, Inc., Seattle, Wash., a corporation of Washington Application November 3, 1939, Serial No. 302,777

2 Claims. (Cl. 265—24)

This invention relates to apparatus for testing motorcycles, and more particularly for testing the power of the engine thereof under various conditions of speed and load.

An object of the invention is to provide a simple and inexpensive apparatus for testing motorcycle engines as to the efficiency thereof.

Another object of the invention is to provide an apparatus for testing motorcycles which may be easily and quickly assembled or disassembled.

Another object of the invention is to provide an apparatus for testing motorcycle engines including means for supporting the driving wheel of the cycles for rotation and a dynamometer detachably connected to the supporting means for ascertaining the power derived from the engine under various conditions of speed and load.

A feature of the invention is a shaft having secured thereon a roller for supporting a wheel and a dynamometer sleeved on the shaft and detachably secured thereto.

Other objects and advantages of the invention will appear from the following description taken in connection with the accompanying drawings, in which—

Fig. 2 is a top plan view of the apparatus;

Fig. 3 is a side elevation of the apparatus;

Fig. 5 is a sectional view of the dynamometer unit;

Fig. 6 is a sectional view of the dynamometer taken substantially on line 6—6, Fig. 5;

Fig. 7 is a sectional view of the dynamometer taken substantially on line 7—7, Fig. 5;

Fig. 8 is an enlarged fragmentary view of the dynamometer illustrating the stator and rotor blades; and Fig. 9 is a vertical sectional view of the fluid pressure producing device.

Figure 1:
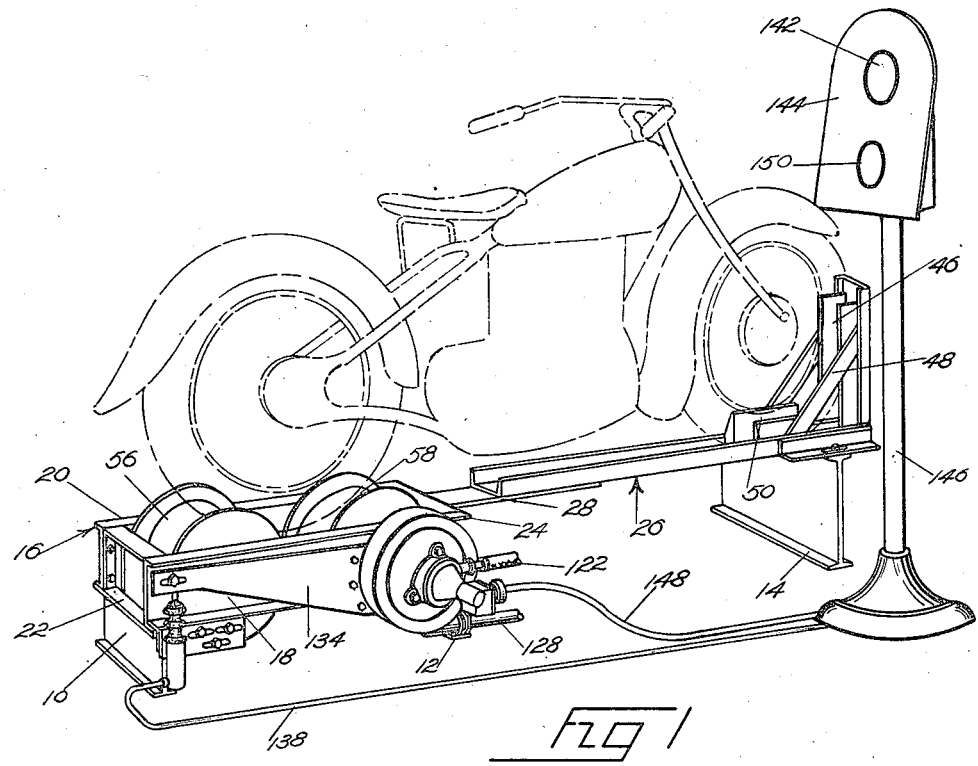
Fig. 1 is a perspective view of a motorcycle testing apparatus embodying the invention.
Figure 4:
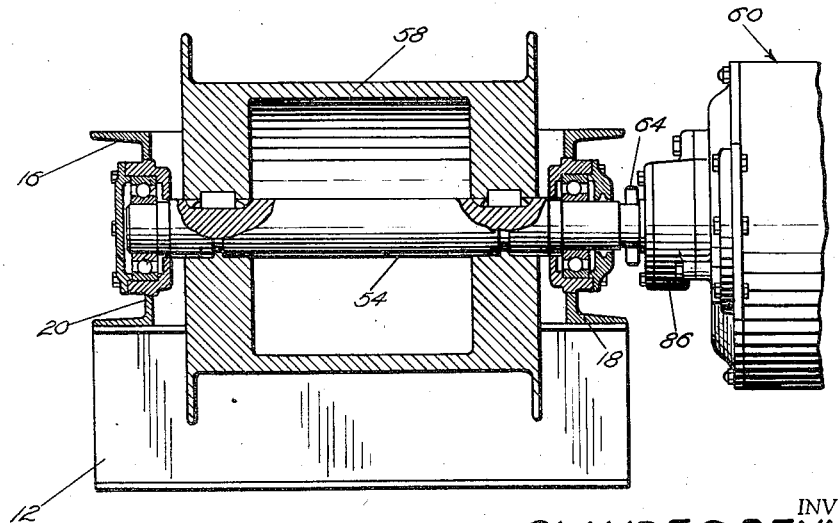
Fig. 4 is a sectional view substantially on line 4—4, of Fig. 2.

Referring to the drawings for more specific details of the invention, 10, 12 and 14 represent spaced supports which may be of any preferred structure. A rectangular frame 16 suitably secured on the supports 10 and 12 includes side rails 18 and 20 connected by cross or end rails 22 and 24. A longitudinally adjustable platform, indicated generally at 26, has one of its ends suitably attached to the end rail 24 of the frame 16, and its other end adjustably secured on the top of the support 14. The adjustable platform 26 preferably includes a flat plate 28 having on its upper face spaced studs 30 preferably arranged in pairs, and a plate 32 slidable on the plate 28 having longitudinal slots 34 receiving the studs. The plate 32 has side flanges 36, and secured to these flanges are angle irons 38 slotted as indicated at 40 for the reception of bolts 42 for securing the plates 32 to the support 14.

An upright 44 suitably secured between the angle irons 38 at the free end of the plate 32 supports a pocket 46 for the reception of a tire on a motorcycle wheel. Suitable braces 48 connect the upright 44 to the side flanges 36 of the plate 32 to lend strength and rigidity to the structure, and a channel member 50 for the support of the front wheel of a motorcycle is secured to the plate 32 between the adjacent ends of the braces.

A pair of spaced parallel shafts 52 and 54 are suitably journaled on the side members 18 and 20 of the frame 16, and fixedly secured to the shafts within the frame are corresponding rollers 56 and 58 adapted to cradle the rear or driving wheel of a motorcycle.

The shaft 54 has an extension at one side of the frame, and a dynamometer indicated generally at 60 is detachably mounted on this extension. As shown, the dynamometer, preferably of the absorption type, includes a sleeve 62 slipped over the extension of the shaft and secured against relative rotation. One end of the sleeve abuts a diametral pin 64 in the shaft suitably spaced from the free end of the extension, and a nut 66 threaded on the free end of the extension bears against the other end of the sleeve and serves to clamp the sleeve between the pin and the nut.

A rotor 68 suitably mounted on the sleeve 62 includes a hub 70 secured on the sleeve as by a key 72. The hub has thereon an annular web 74 provided with a rim 76, and corresponding groups of radial vanes 78 arranged in oppositely disposed relation to one another on the respective sides of the web connect the hub and rim. The vanes are inclined outwardly from the web, and the edges thereof are in a plane common to the ends of the hub and edges of the rim.

A stator 80 housing the rotor 68 is suitably mounted for oscillation on the sleeve 62. As shown, anti-friction bearings 82 and 84 arranged in spaced relation to one another on the sleeve 62 support for oscillation oppositely disposed hubs 86 and 88, and corresponding oppositely disposed end sections 90 and 92 sleeved on the shaft are suitably secured to the hubs as by bolts.

Each of the end sections 90 and 92 includes a hub 94 having a packing box 96 for the reception of suitable packing 98 and a retaining nut 100 slipped over the sleeve, for inhibiting seepage of fluid between the end sections 90 and 92 and the sleeve 62. The hub 94 has thereon substantially at the outer end thereof an annular dished web 102 provided with a rim 104 having an annular shoulder 106. The web has on its inner face a circular rib 108 substantially semi-elliptical in cross-section and radial vanes 110 inclined outwardly from the web and connecting the hub and rim. The outer edges of the vanes are in a plane common to the inner edge of the rim, and the vanes on the respective ends are arranged in oppositely disposed relation.

A cylindrical section 112 has on its edges annular shoulders 114 and 116 received by the annular shoulders 106 on the end sections with suitable gaskets interposed, and a plurality of stay bolts 118 passed transversely through the rim 104 serve to secure the end sections and the cylinder section together so as to provide a water-tight case.

One of the end sections, preferably 92, has an inlet port 120 connected by a conduit 122 to a suitable source of water under pressure, and a valve 124 is connected in the conduit for control of the flow of water to the dynamometer. The cylindrical section 112 has a discharge port 126, and a conduit 128 connected to the discharge port has connected therein a valve 130 for controlling the discharge of water from the dynamometer.

A torque arm 132 fixedly secured to the cylindrical section 112 of the stator is adjustably connected to an actuator 134 of a fluid pressure producing device 136 adjustably supported on the frame 16, and a fluid pressure delivery pipe 138 connects the fluid pressure producing device to a suitable indicating instrument 142 arranged on an instrument board 144 supported on a portable stand 146. The actuator 134 operates through the associated piston to develop fluid pressure in the cylinder with which the pipe 138 communicates. A ball check valve is provided to compensate variations in fluid volume when the device is inoperative.

A flexible cable 148 connects the extension on the shaft 54 to a speed indicating instrument 150 suitably arranged on the instrument board. This indicating instrument may be a speed indicator or revolution counter.

In practice, a motorcycle, the engine of which is to undergo test, is indicated in dotted lines in Fig. 1 of the drawings as supported on the apparatus with its rear or driving wheel cradled by the rollers 56 and 58 and its front wheel in the supports 46 and 50. The driving wheel is driven by the engine of the motorcycle, and the rollers 56 and 58 are driven through frictional engagement of the driving wheel with the rollers.

Upon rotation of the rollers 56 and 58, the shaft 54 is driven. This actuates the rotor 68 of the dynamometer 60 so that the power derived from the engine of the motorcycle may be ascertained under various speed and load conditions. The engine of the motorcycle is driven to simulate road or service conditions, and the dynamometer, which is of the absorption type, affords highly desirable means for imposing resistance or load on the engine. The dynamometer 60 may be controlled to vary the resistance or load by varying the rate of admission of water through the valve 124 to the dynamometer, and the rate of discharge of the water from the dynamometer through the valve 130 so that various loads may be imposed on the engine at various rates of speed thereof. This actuation of the dynamometer actuates the torque arm 132, which in turn actuates the fluid pressure device 136 connected by the fluid pressure delivery pipe or conduit 138 to the instrument 142 for indicating the power of the engine under various conditions, and during this operation the shaft 54 drives the flexible shaft 148 connected to the instrument 144 for indicating the speed of the motorcycle under the load imposed.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is—

1. An apparatus for testing a motorcycle comprising a frame, a short shaft journaled on the frame, a relatively long shaft journaled on the frame in spaced relation to the short shaft having a part extended from one side of the frame, rollers secured to the shafts within the frame, an adjustable runway attached to the frame, a rack on the runway for supporting a wheel in a fixed position, a dynamometer including a sleeve, a rotor secured to the sleeve and a stator oscillatable on the sleeve, means for detachably securing the sleeve on the extension of the long shaft, an arm secured to the stator of the dynamometer arranged in parallel relation to the frame, a fluid pressure producing device supported on the frame for actuation by the arm, a measuring instrument connected to the device, and a tachometer connected to the shaft supporting the dynamometer.

2. A power tester for a motorcycle having front and rear wheels comprising a frame, a longitudinally adjustable runway, means carried by the runway to engage the front wheel of the motorcycle to support the motorcycle in an upright position, a pair of spaced shafts journalled in the frame, an extension of one of said shafts projecting laterally beyond the frame, an idler roller mounted on one of the shafts, a driving roller fixed to the shaft having the extension, a hydraulic dynamometer having spaced stator members rotatably mounted on the shaft extension, a rotor member interposed between the stator members, connecting means between said shaft extension and the rotor member, manually operable valve means to admit liquid to the stator member and to control the discharge of liquid therefrom to vary the power required to drive the dynamometer, a torque arm carried by the stator members, a fluid pressure producing device having a member positioned to be engaged by the torque arm, and an indicating device operably connected to said fluid pressure producing device.

CLAUDE C. BENNETT.